United States Patent [19]

Lexau et al.

[11] Patent Number: 5,355,470
[45] Date of Patent: Oct. 11, 1994

[54] METHOD FOR RECONFIGURING INDIVIDUAL TIMER REGISTERS OFFLINE

[75] Inventors: Jon K. Lexau; Allan J. Zmyslowski, both of Sunnyvale; Quang H. Nguyen; Robert A. Shaw, both of San Jose; Carolee V. Newcomb, Los Altos, all of Calif.

[73] Assignee: Amdahl Corporation, Sunnyvale, Calif.

[21] Appl. No.: 816,219

[22] Filed: Jan. 3, 1992

[51] Int. Cl.$^5$ .................. G06F 11/34; G06F 11/00
[52] U.S. Cl. ........................ 395/575; 371/8.1
[58] Field of Search ............... 395/575; 364/242, 941, 364/950, 950.4, 950.5; 371/16.3, 8.1

[56] References Cited

U.S. PATENT DOCUMENTS

| | | | |
|---|---|---|---|
| 3,803,568 | 4/1974 | Higashide | 371/8.1 |
| 4,090,239 | 5/1978 | Twibell et al. | 364/200 |
| 4,118,792 | 10/1978 | Struger et al. | 395/575 |
| 4,490,581 | 12/1984 | Edwards et al. | 371/8.1 |
| 4,538,272 | 8/1985 | Edwards et al. | 371/8.1 |
| 4,653,054 | 3/1987 | Lu et al. | 371/8.1 |
| 5,014,261 | 5/1991 | Shinbashi et al. | 371/8.1 |

Primary Examiner—Robert W. Beausoliel, Jr.
Assistant Examiner—Trinh Tu
Attorney, Agent, or Firm—Fliesler, Dubb, Meyer & Lovejoy

[57] ABSTRACT

A timer unit that permits individual timer registers to be taken offline from the timer complex. A single register is taken offline instead of checkstopping the entire computer system due to a damaged timer, for example, thereby reducing system outages and thus providing increased availability of the system.

2 Claims, 9 Drawing Sheets

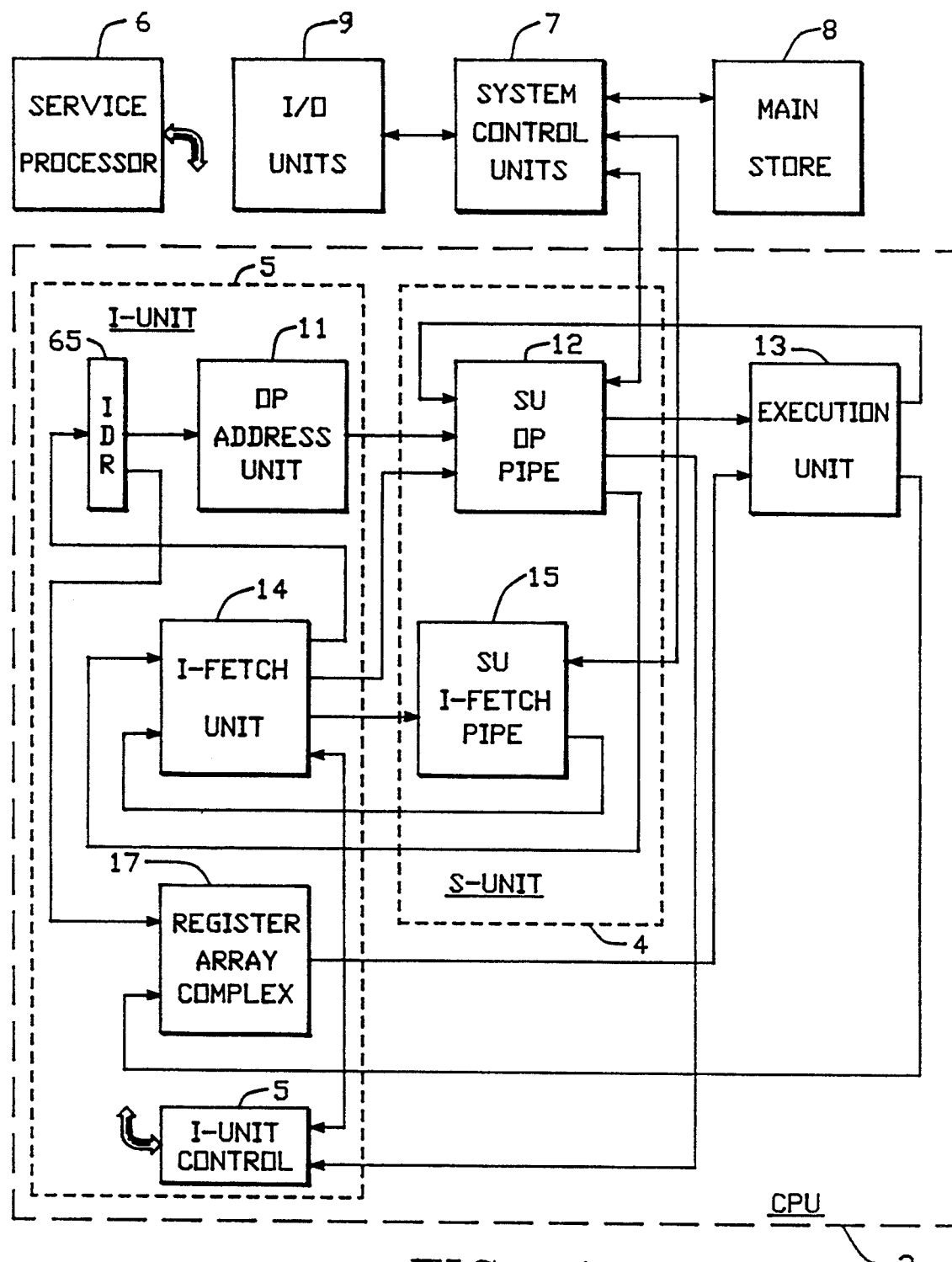
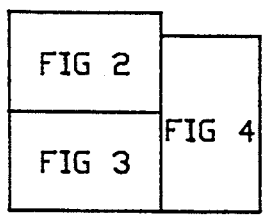
FIG.-1

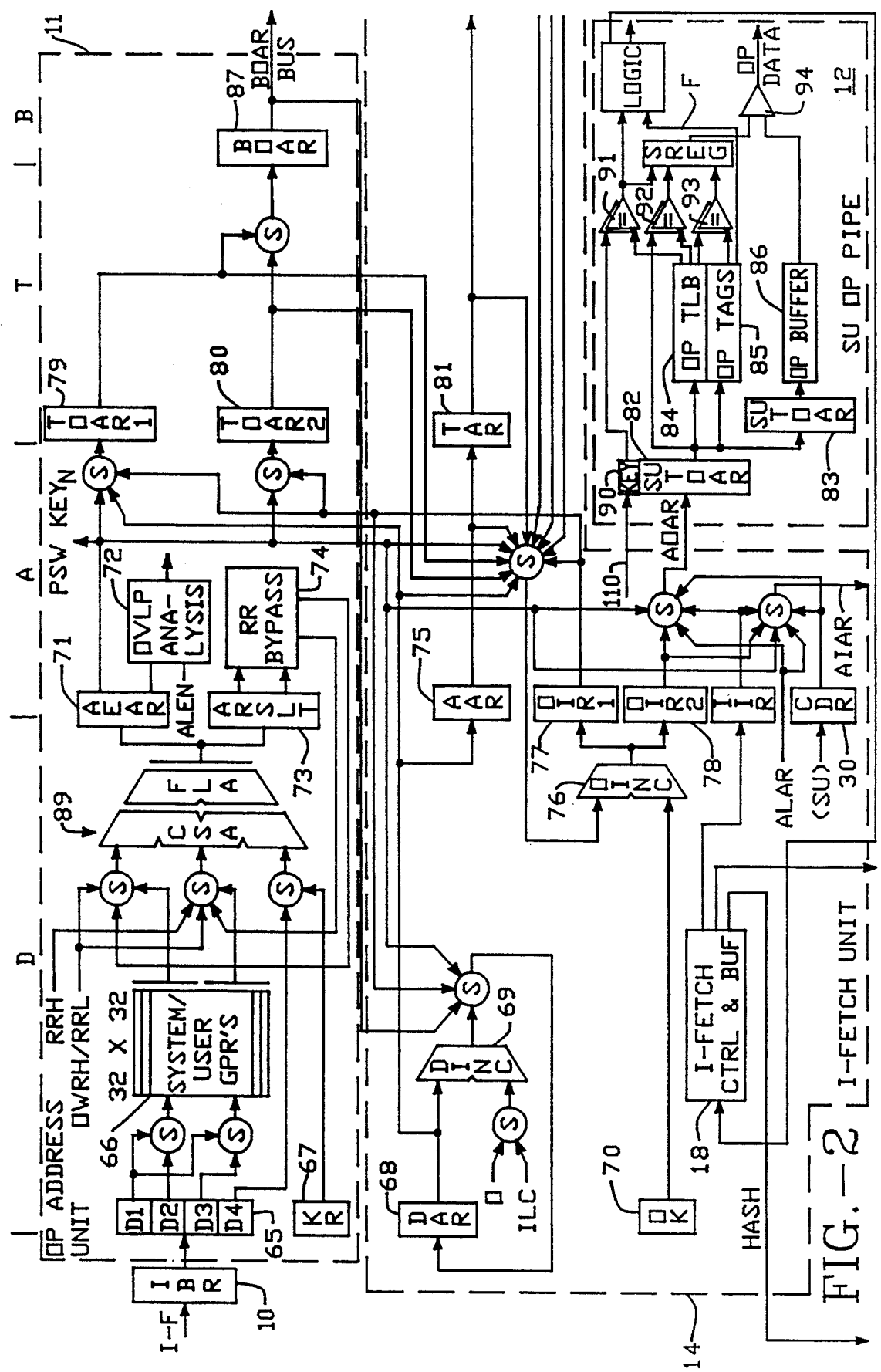

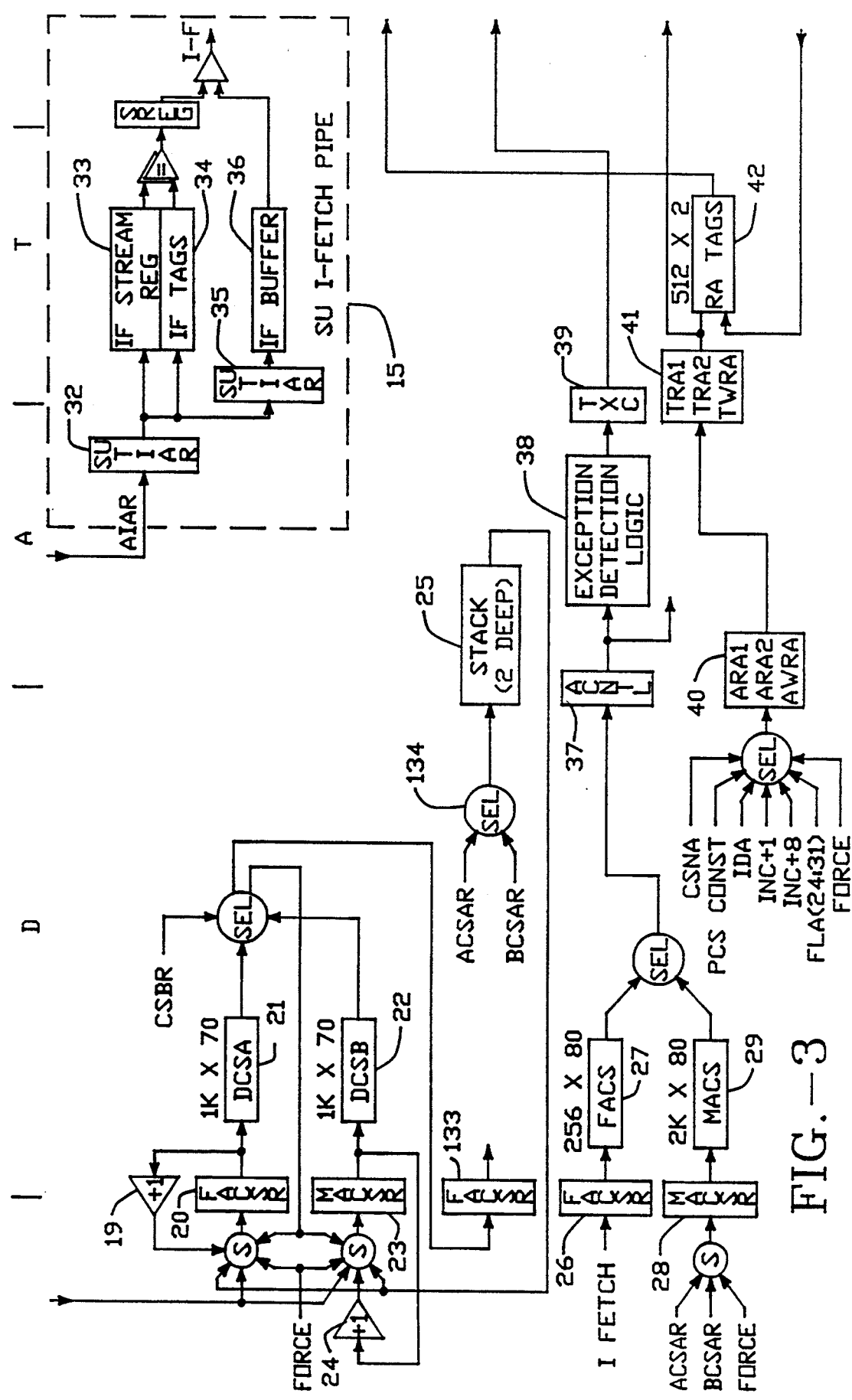
FIG.—3

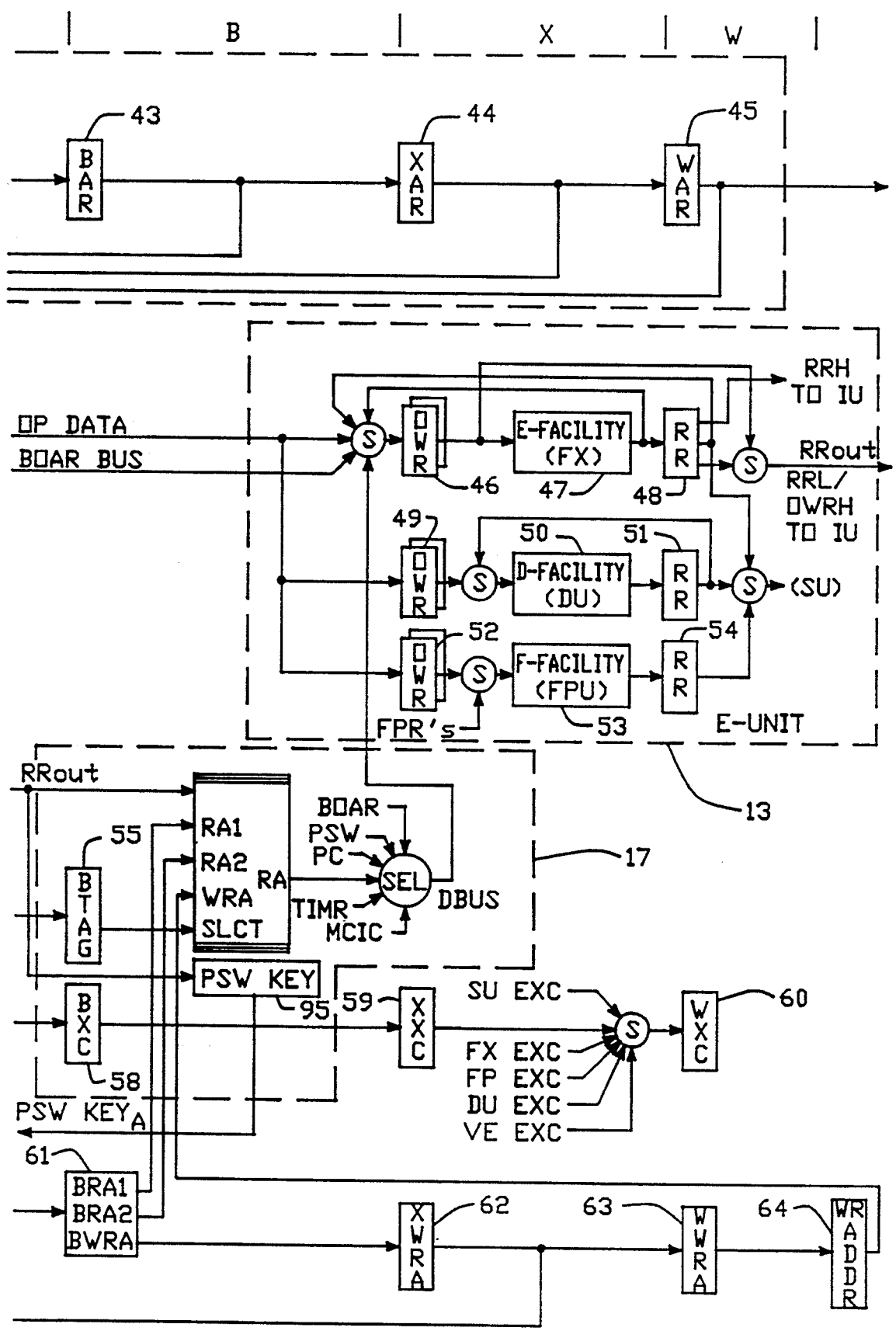
FIG.−4

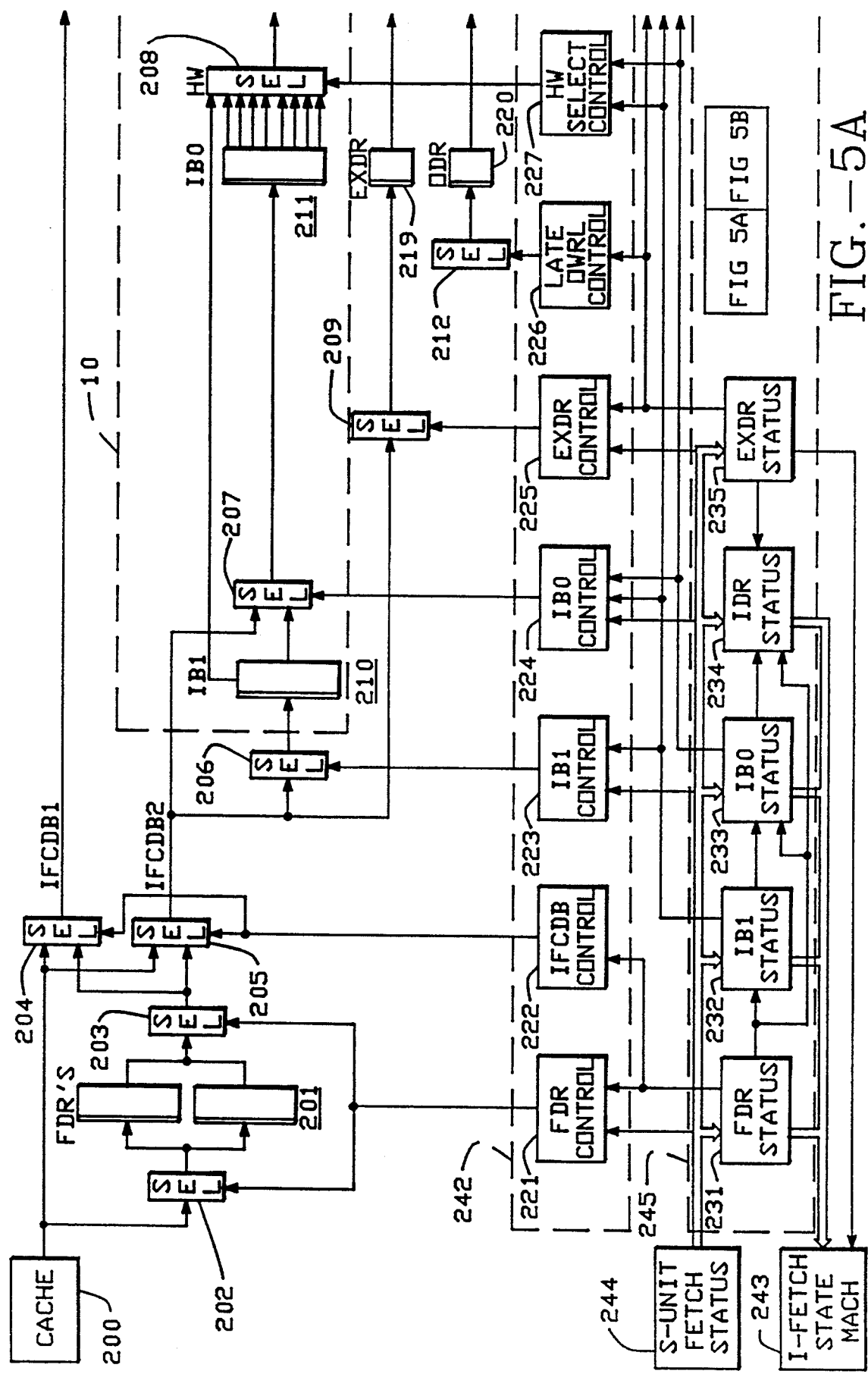
FIG.—5A

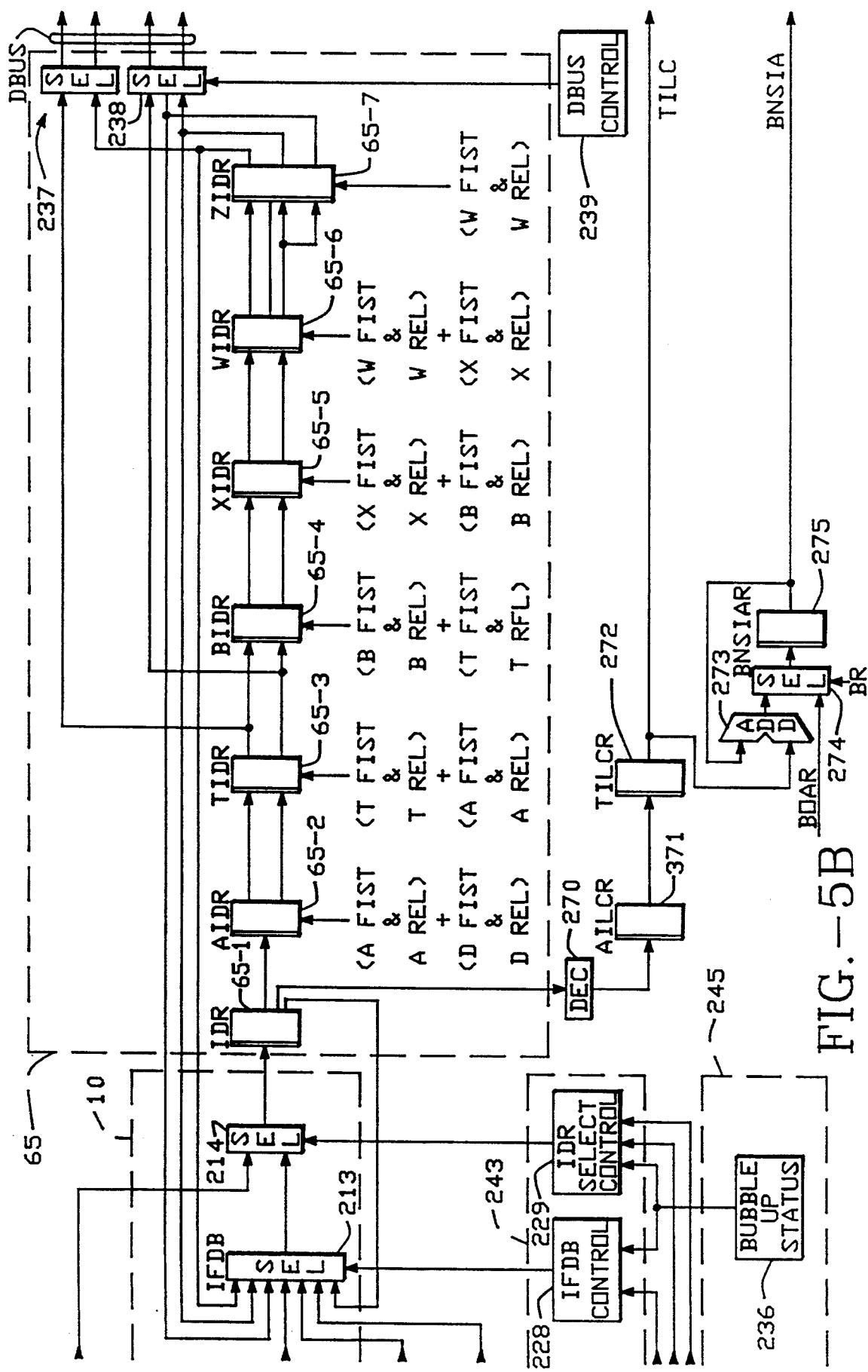
FIG.—5B

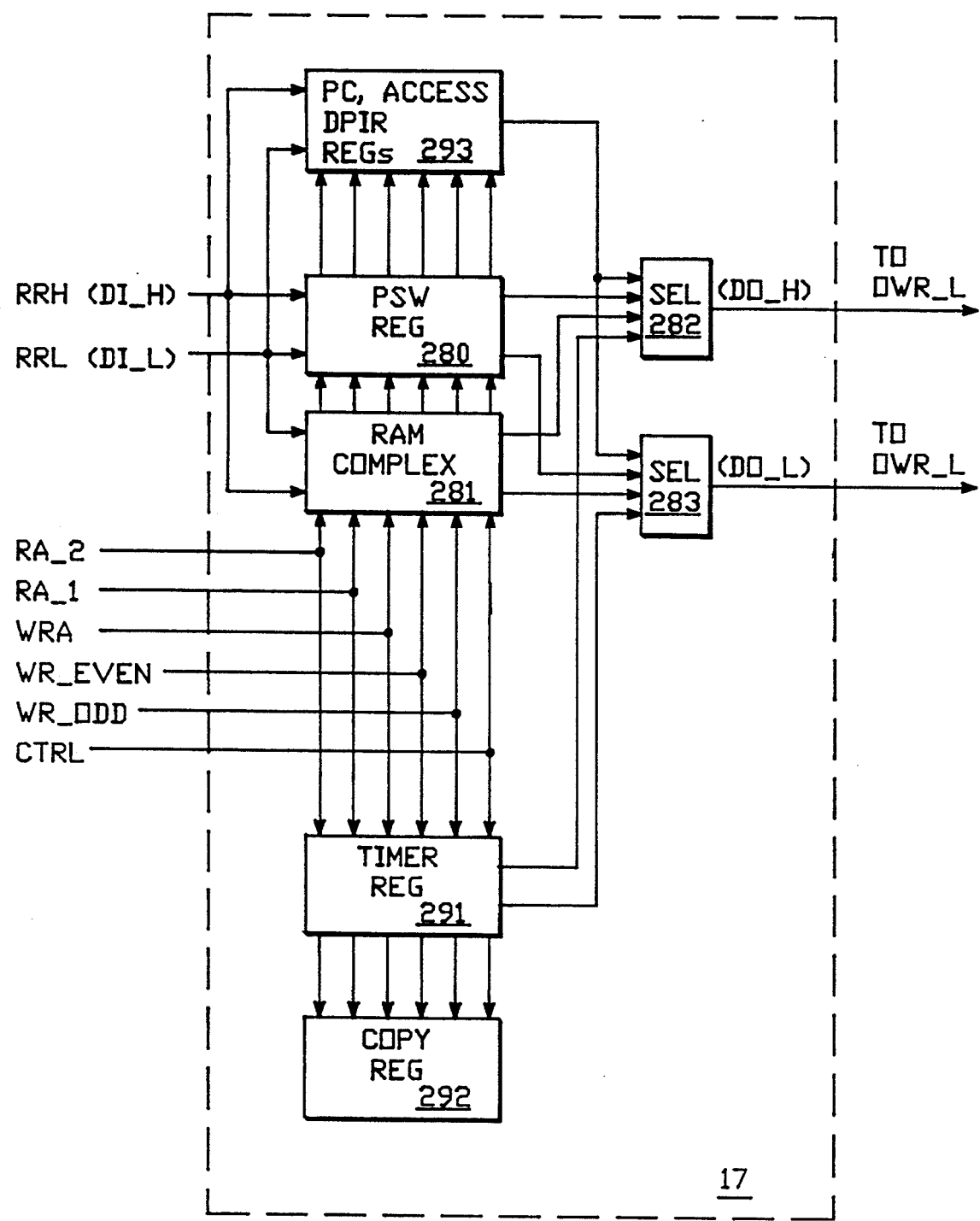
FIG.—6

METHOD FOR RECONFIGURING INDIVIDUAL TIMER REGISTERS OFFLINE

BACKGROUND OF THE INVENTION

The present invention relates to the field of computers and particularly to computers that operate in accordance with the IBM ESA/390 architecture and particularly to timers in computers.

Timers are critical to computer system operation. The IBM ESA/390 architecture defines a number of timers and system implementations of that architecture may provide additional timers. The operation of such timers including the setting, resetting, stopping and starting becomes complex in large systems that have many different modes of operation and that operate with units of operation (UO).

The IBM ESA/390 architecture defines a unit of operation (UO) that is used to control the instants when an interruption can be examined and serviced. Interruptions can occur at any point in time; however, they are only examined and serviced during the interrupt processing time (IPT) between the end of one unit of operation and the start of the next unit of operation.

TABLE A depicts the relationship between units of operation and instruction processing time.

TABLE A

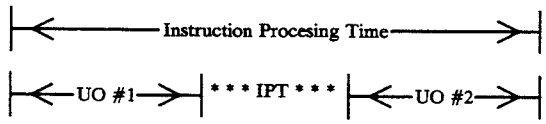

Most instructions consist of only one unit of operation. However, long and more complex or repetitive instructions such as MOVE LONG, COMPARE LOGICAL LONG, TEST BLOCK and UPDATE TREE consist of many units of operation.

The unit of operation is needed in large computer systems because of the need for having a reasonable response time for interruptions while avoiding complex instruction processing unit. If the interruptions have to be taken at any point in time during the instruction processing time, then the CPU design will be considerably more complex than if the interruptions are only taken at the end of instruction processing time.

ESA/390 architecture computers are controlled in part by a Program Status Word (PSW). The program-status word (PSW) includes the instruction address, condition code, and other information used to control instruction sequencing and to determine the state of the computer. The active or controlling PSW is called the current PSW. It governs the program currently being executed.

The CPU has an interruption capability, which permits the CPU to switch rapidly to another program in response to exception conditions and external stimuli. When an interruption occurs, the CPU places the current PSW in an assigned storage location, called the old-PSW location, for the particular class of interruption. The CPU fetches a new PSW from a second assigned storage location. This new PSW determines the next program to be executed. When it has finished processing the interruption, the interrupting program may reload the old PSW, making it again the current PSW, so that the interrupted program can continue.

The status of the CPU can be changed by loading a new PSW or part of a PSW. Control is switched during an interruption of the CPU by storing the current PSW, so as to preserve the status of the CPU, and then loading a new PSW.

A new or modified PSW becomes active (that is, the information introduced into the current PSW assumes control over the CPU) when the interruption or the execution of an instruction that changes the PSW is completed.

A storage key is associated with each 4K-byte block of storage that is available in the configuration. The storage key has the following format.

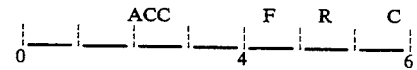

The bit positions in the storage key are allocated as follows:

Access-Control Bits (ACC)

If a reference is subject to key-controlled protection, the four access-control bits, bits 0–3, are matched with the four-bit access key when information is stored, or when information is fetched from a location that is protected against fetching. Fetch-Protection Bit (F):

If a reference is subject to key-controlled protection, the fetched protection bit, bit 4, controls whether key-controlled protection applies to fetch-type references are monitored and that fetching with any access key is permitted; a one indicates that key-controlled protection applied to both fetching and storing. No distinction is made between the fetching of instructions and of operands.

Reference Bit (R)

The reference bit, bit 5 normally is set to one each time a location in the corresponding storage block is referred to either for storing or for fetching of information.

Change bit (C)

The change bit, bit 6, is set to one each time information is stored at a location in the corresponding storage block. Protection Protection facilities are provided to protect the contents of main storage from destruction or misuse by programs that contain errors or are unauthorized. Key-controlled protection, access-list-controlled protection, page protection, and low-address protection are forms of protection available in ESA/390. Key-Controlled Protection When key-controlled protection applies to a storage access, a store is permitted only when the storage key matches the access key associated with the request for storage access; a fetch is permitted when the keys match or when the fetch-protection bit of the storage key is zero.

The keys are said to match when the four access-control bits of the storage key are equal to the access key, or when the access key is zero.

Fetch-Protection-Override Control

Bit 6 of control register 0 is the fetch-protection-override control. When the bit is one, fetch protection is ignored for locations at effective addresses 0-2047. An effective address is the address which exists before any transformation by dynamic address translation or prefixing. However, fetch protection is not ignored if the effective address is subject to dynamic address translation and the private-space control, bit 23, is one in the segment-table designation used in the translation.

Fetch protection override has no effect on accesses which are not subject to key-controlled protected.

Access-List-Controlled Protection

In the access-register mode, bit 6 of the access-list entry, the fetch-only bit, controls which types of operand references are permitted to the address space specified by the access-list entry. When the entry is used in the access-register-translation part of a reference and bit 6 is zero, both fetch-type and store-type references are permitted, and an attempt to store causes a protection exception to be recognized and the execution of the instruction to be suppressed.

Page Protection

The page-protection facility controls access to virtual storage by using the page-protection bit in each page-table entry. It provides protection against improper storing.

One of the instructions that is able to modify part of a PSW is the Set PSW Key From Address (SPKA) instruction. The ESA/390 architecture requires the SPKA instruction to load the architecturally defined PSW "access key" from four bits extracted from the effective address of the SPKA instruction. The access key is used to limit the access of future instructions to certain storage areas to aid in providing protection and privacy of information.

One well-known computer operating with the IBM ESA/390 architecture is the Amdahl 5995-A computer. In that computer, the I-Unit pipeline is a six stage pipeline consisting of stages D, A, T, B, X, and W that process instructions.

One of the functions of the D stage is to collate the necessary information to reference storage in the A, T, and B stages. This D-stage function includes the generation of the effective address and selection of the access key to be used by the reference. The A, T, and B stages fetch operands/data using the current valid key that is defined by the architecture, PSW $KEY_A$.

One of the functions of the W (write) stage is to write results of operations to architecturally defined registers or storage. The W stage in the pipeline comes after the fetch-operands/data stages (A, T, and B) and the arithmetic functions stage (X). The access key used is the key, PSW KEYA, from the architecturally defined PSW register. After the access key in the PSW has been updated in the W stage, the new key, $PSW_N$, is available for future operations/instructions and the new key becomes the architecturally defined key, PSW $KEY_A$. The ESA/390 architecture requires that the new key be effective starting from the instruction immediately following the SPKA instruction. The new PSW key can be used in a subsequent D segment while being updated in the W segment.

In computer systems, a system control program (SCP) is responsible for resource management and often uses architectural registers. Computer systems under control of the control program operate in User State and in Control State. In User State, user programs and vendor-provided operating systems execute. IBM system control programs (CP's) run in User State. Certain instructions and facilities of User State may be emulated by Control State software.

Control State is for controlling system resources and they may be shared by multiple domains and provide emulation when necessary. Emulation may be used for enhancing the IBM ESA/390 architecture or may be used so that User State programs that run on one manufacturer's machines having one set of hardware may run on another manufacturer's machines with different hardware. Control State operation is based on the IBM ESA/390 architecture. Entry to Control State from User State is vectored, invoked by Control Interceptions that require assistance by Control State software.

Transitions from User State to Control State occur under a number of conditions. For example, a transition may occur when an instruction occurs that is defined as an emulated instruction when an instruction occurs for which a specific interception control is set, when an interruption occurs for which a specific interception control is set, when an interruption occurs that is defined as a mandatory Control Interception.

The SCP in some environments operates the machine hardware and multiplexes the physical resources of the computing system into multiple logical entities called virtual machines, each of which is a simulation of a computer dedicated to the servicing of a single user or (in the case of a server) a single application. Virtual machines are software entities that can be easily configured to running a particular program rather than to a user. A virtual machine configured in this manner is referred to as a virtual machine server. By virtualizing, operating systems can link guest systems together without the need for guest-specific actual hardware. Also, operating systems allow multiple guest systems to share devices and other resources to simplify configuration and maintenance.

Resource management (SCP) and user management (CMS) are separate. When a CMS user logs on to the system, the SCP (system control program) creates a virtual machine for that user that includes, among other things, storage address space. An address space is a sequence of addresses that starts at one address and extends up to a value that varies according to size. Storage management is an important task of the supervisor or host which must create, share, and otherwise manage address spaces, gain and relinquish access to an address spaces, and map data on external devices.

Virtual machines running in the ESA/390 architecture have at least one address space, the primary address space, given to the user by the SCP when the user logs on to the system. The size of this address space is determined from the entry describing that user in the user directory, or from a subsequent DEFINE STORAGE command. After logging on, if authorized in the user directory, a user may create other address spaces and share them with other logged-on users.

Interpretive-Execution

The IBM Interpretive Execution Facility ( IEF ) allows a computer system running under a host System Control Program (SCP) to interpret a virtual machine called the guest. The term "host" refers to the real machine together with the SCP running on the real machine. The host manages real-machine resources and provide services to the guest programs which execute in an interpreted machine. The interpreted and host machines execute guest and host programs, respectively. For a transfer of control from a guest virtual machine back to its host System Control Program (SCP), an "interception" occurs.

In the existing computer architecture, when a guest issues a START INTERPRETIVE EXECUTION (SIE) instruction, the instruction is intercepted and emulated by the host program at a significant performance cost. Through emulation, the host provides the functions of a selected architecture which may be available on some other real machine or which may be available only in the virtual-machine environment. Privileged and problem-program instruction execution, address translation, interruption handling, timing and other functions are interpreted so that those functions are executed in the context of the virtual machine. With the addition of special-purpose hardware, interpreted execution can approach speeds that are comparable to native-mode execution, that is, execution by a non-interpritive version of the architecture.

In the virtual-machine environment, the guest program has access to all the functions defined for the designated architecture either through an interpretive-execution facility or by the host system control program. For VM/ESA, the control program CP provides functions through simulation. Simulation generally executes guest functions transparently so that the guest program is unaware as to whether a function is performed by the machine or the host except that simulation usually requires more time.

When an SIE instruction is executed, the operand of the SIE instruction containing the State Description is fetched to obtain information about the current state of the guest. When execution of SIE ends, information representing the state of the guest, including the guest program status word (PSW), is saved in the state description before control is returned to the host. The information in the state description, as used and modified by the host during simulation, allows the guest to start and stop execution with valid information. The state description also determines the mode and other environmental conditions in which the guest is to execute.

While in interpretive-execution mode the host, in order to be protected from interference by guests or interferance among guests, allocates portions of the real-machine resources to the virtual machine. Guest storage is confined to a portion of host real storage or to host virtual address spaces controlled by the host system. Host enabled and disabled states generally are undisturbed by execution of the guest. A complete and logically separate set of control registers is maintained by the machine for use by the host and another set for each guest is maintained for use by the guest. Other registers are shared between the host and guests.

In some cases, the host intercepts operations normally performed by the machine. The state description includes control bits settable by the host to cause intercept operations under specific conditions. When the specific condition are met, the machine returns control to host simulation. Intervention controls capture the introduction of an enabled state into the PSW, so that the host can present an interruption which it holds pending for the guest. Intervention controls may be set asynchronously by the host on another real processor while interpretation proceeds. The machine periodically refetches the controls from storage, so that updated values will be recognized. Guest interruptions can thereby be made pending without prematurely disturbing interpretation.

Guest Storage

Preferred-storage mode and pageable-storage mode are provided for in the interpretive-execution architecture. In preferred-storage mode, a contiguous block of host absolute storage is assigned to the guest and in pageable-storage mode, dynamic address translation (DAT) at the host level is used to map guest main storage. In preferred-storage mode, the lower addresses of the machine storage are dedicated to the guest and only one guest can obtain production mode performance.

Multiple High-performance Guests

The Multiple Domain Facility TM (MDF TM) available on Amdahl computers provided concurrent execution of two or more operating systems with high performance on a single shared central computing complex. Such operation permits the reassignment of resources dynamically with minimal performance penalty for a variety of different architectures or systems.

System Timers

In prior art systems, if a timer exhibited an error or was otherwise to be taken offline, a machine check (MCK) resulted and the entire computer system was checkstopped resulting in significant reduction in the performance of the computer system. The more complex that computers become, the more severe becomes the impact of check stopping the computer.

Accordingly, there is a need for an improved computer system having inprovements in control of timers.

SUMMARY OF THE INVENTION

The present invention is a timer unit that permits individual timer registers to be taken offline from the timer complex. A single register is taken offline instead of checkstopping the entire computer system due to a damaged timer, for example, thereby reducing system outages and thus providing increased availability of the system.

The timer unit includes an I-bit (inhibit-bit) register for storing local copies of the I-bits, suppresses setting of any EHL's associated with the off-line register as well as the Control State Timing Facility Damage (TFD) interrupt which would normally occur, and forces the E-bit on if the off-line register is read out of the timer complex.

Process Control (PC) registers contain local copies of the I-bits, logic to detect a read or write to an off-line timer register and consequently force a clock-on PD machine check, and the MCIC<timer> bit which indicates to Macrocode that the timer facility was the source of the machine check.

A Register Array (RA) location which contains a Timer Facility Error Inhibition Register (Ox1F) which is used by Macrocode to determine which timer(s) are off-line.

SCode control code executes threshold routines which will set the I-bits on PC, TIMER, and the RA; updating the exigent machine check algorithm to set the MCIC<timer> bit for timer I-bit related errors; and modifying the E-unit STCK (Store clock) algorithm to take the I-bit into account.

Macrocode performs one of two actions, depending on which register is in error. Either the function of that register is emulated (i.e. replacing one time with another) or the appropriate error condition is reflected to the domain.

Under normal operating conditions, all of the I-bits are off, and the error detection logic on PC is disabled. When an error occurs on a timer register an EHL will be set, causing the System Error Handler (SEH) to be invoked. When SEH determines that the error has crossed its threshold limit, special SCode is called to set all copies of the I-bits for the damages register (s). From this point onward, no more EHL's will be set, or TFD's generated, due to this timer. Instead, PC will detect a read or write to this register and force a clock-on PD machine check. The exigent machine check algorithm will set the MCIC<timer> bit so that Macrocode knows that the machine check is due to a timer reference with the I-bit set. Macrocode will then take appropriate action for this register as explained above.

The foregoing and other objects, features and advantages of the invention will be apparent from the following detailed description in conjunction with the drawings.

BRIEF DESCRIPTION OF THE DRAWINGS

FIG. 1 depicts an overall block diagram of a computer system incorporating the present invention.

FIG's. 2, 3 and 4 depict detailed block diagrams of the FIG. 1 system.

FIG's. 5A and 5B depict a block diagram of the I-Fetch data and control circuitry that forms part of the FIG. 1 system.

FIG. 6 depicts a detailed block diagram of the register array complex.

Figure 7:
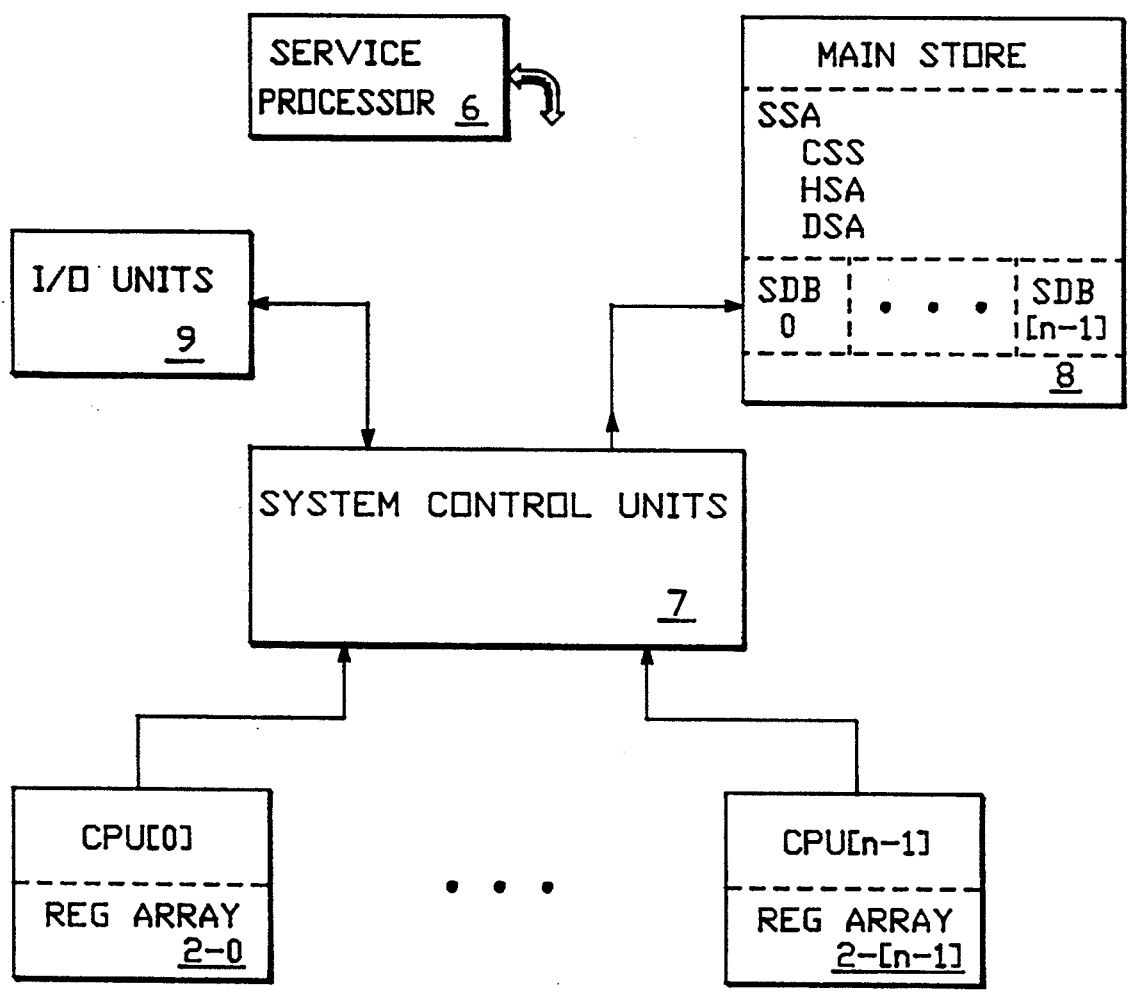

FIG. 7 depicts a block diagram of a multiple CPU system using multiple CPU's of the FIG. 1 type.

Figure 8:
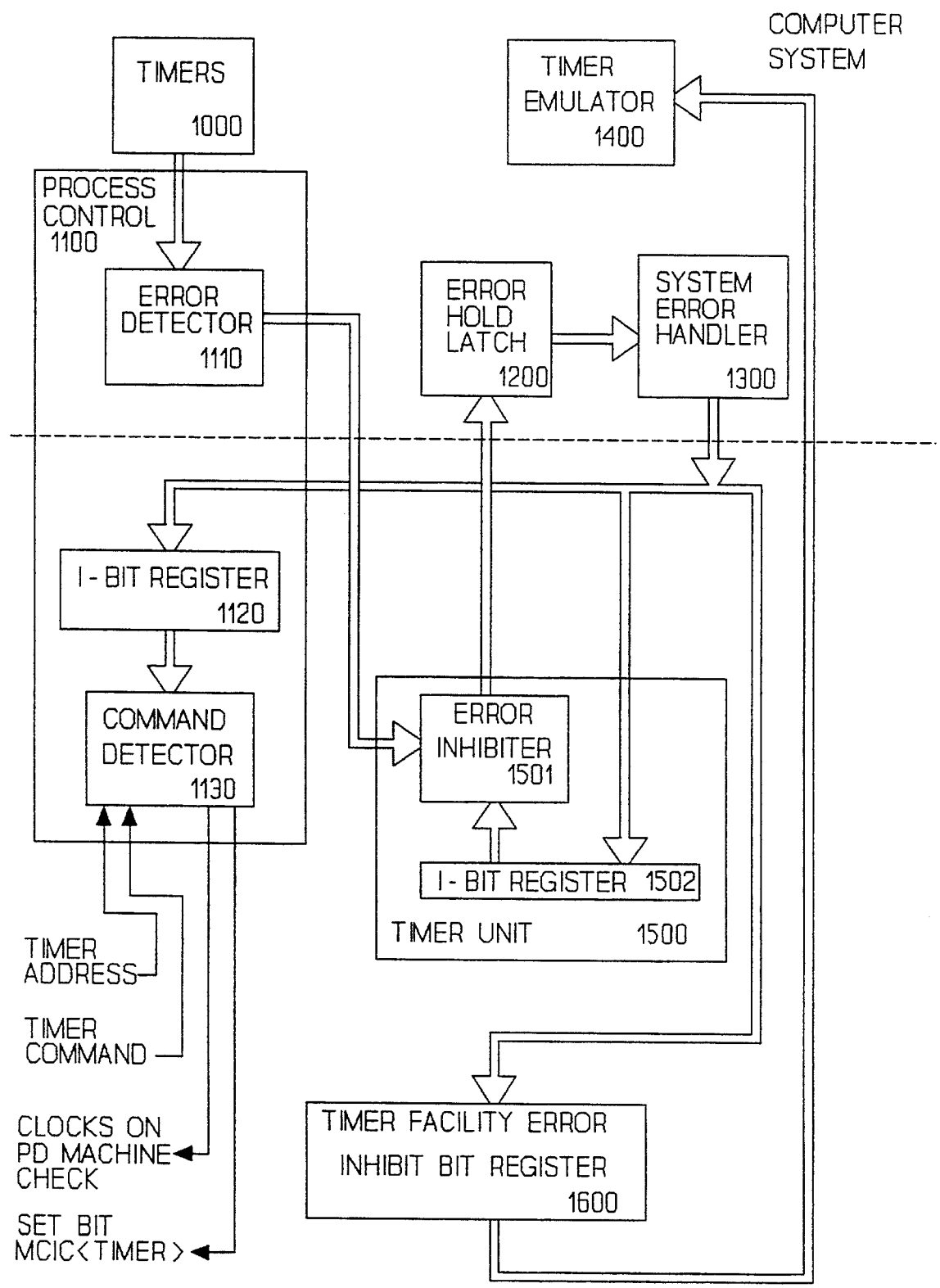

FIG. 8 depicts a block diagram of the elements in the computer system and the timer system for carrying out the invention.

DESCRIPTION OF THE PREFERRED EMBODIMENTS

Overall Computer System—FIG. 1

In FIG. I, a computer system compatible with the Amdahl 5995-A computer operating in accordance with the ESA/390 architecture is shown. The computer system of FIG. 1 includes an instruction unit (I-unit) 5, a storage unit (S-Unit) 4, an execution unit (E-Unit) 13, system control units 7, I/O units 9, main store 8, and a service processor 6. The instruction unit 5 includes an operand address unit 11, an instruction data register 10, an I-fetch unit 14, a register array 17, and an I-unit control 3. The storage unit 4 includes an SU Op Pipe 12 and an SU I-Fetch Pipe 15.

The FIG. 1 system features two machine states, User State and Control State. In User State, supersets of the IBM ESA/390 architecture are supported. Some User State operations may be emulated by Control State software. The architecture provides support for Control State Software to implement the "Multiple Domain Facility" (MDF). MDF provides for multiple computing systems to exist in User State on one processor complex. This operation is accomplished by providing each virtual computing system (domain) with its own private main storage, channels, operator console, and optionally expanded storage, while multiplexing all domains on the CPU resources available to the processor complex.

A "Domain" is a set of resources such as CPU's, main storage and channels available to a User State control program(CP). A domain program is a User State program. A domain consists of both domain-native and guest resources. The terms "User", "User State", and "LP (Logical Processor)" also refer to both domain-native and guest resources, although LP usually is used to refer to a domain CPU.

A "Guest" is a resource that requires the presence of a supporting 'host' domain control program. A guest program is one that runs in an environment consisting of a specific set of guest resources. When a CPU operates in guest mode (User State or Control State), domain resources accessed by a program are guest resources (for example, guest PSW) by default. In Control State, access to other resources is under program control which is sometimes called interpretive-execution mode. Domain Mode Control <A> indicates whether a CPU operates in guest mode or not.

"Domain-native" is a resource that does not require the presence of a domain control program. A domain-native program is one that runs in an environment consisting of domain-native resources. A CPU is in domain-native mode if it is not in guest mode; in this mode, domain resources accessed by a program are domain-native resources (for example, domain-native PSW) by default. In Control State, access to other resources is under program control.

A "Host" is a domain program that supports guest resources. The term "host" is meaningful when discussed in the context of a guest. Host resources may behave differently when the CPU is in guest mode. The term "host mode" may sometimes be used interchangeably with "domain-native" mode.

User programs and vendor-provided operating systems run in User State. IBM SCPs run in User State. User State may be in either System/370 or ESA/390 mode. Certain instructions and facilities of User State may be emulated by Control State software.

Control State is for controlling system resources and they may be shared by multiple domains and may provide emulation. Emulation is often used for enhancing the IBM ESA/390 architecture or for enabling User State programs that run on one manufacturer's machines to run on another manufacturer's machines. Control State operation is based on the IBM ESA/390 architecture. Entry to Control State from User State is vectored, invoked by Control Interceptions that require assistance by Control State software.

Transitions between User State and Control State occur under a number of conditions. For example, transitions occur when an instruction occurs that is defined as an emulated instruction, when an instruction occurs for which a specific interception control is set, when an interruption occurs for which a specific interception control is set, and when an interruption occurs that is defined as a mandatory Control Interception.

In the FIG. 1 system, there are two types of units of operation, the domain unit of operation (DUO) and the machine unit of operation (MUO).

In the FIG. 1 system, the System Communication Interface (SYSCOM) provides a means of communication among Control State software and various processing units within a system. These processing units include I/O Processors (IOPs), service processors (SVPs), and CPUs. The means of communication is through passing data in control blocks in the HSA, and informing the recipient via a signaling mechanism.

In FIG. 1, the service processor (SVP) 6 is provided to assist in configuration of the system, machine check handling, operator facilities, and other model-dependent functions.

The FIG. 1 system includes a facility to permit asynchronous communication between TCMPs using messages. The message processing facility and the instructions to support them are collectively known as the TCMP unification facility (TUF). TUF is distinguished from a local area network. The TUF assembles large single system images by linking TCMPs. The resulting complexes are used for transaction processing in large enterprises.

In the FIG. 1 system, the architectural register sets are defined as follows: access registers (AR), floating point registers (FR), general registers (GR), Control State and domain AR MAP registers (MR), register array (RA), and vector registers (VR). Other individual registers, such as the program status word (PSW), are also defined.

Using the GR as an example, the following notation is used to identify subsets of a register set. To specify register x of the set of GRs, the notation GRx is used if x is a number; the notation GR(x) is used if x is a variable (for example, GR(R1) means the general register designated by the R1 operand).

To specify the consecutive bit positions beginning with w and ending with z the notation <w:z> is used A string of bits is specified by listing the bits, separated by commas as in <x, w:z ... >. To specify bit string y of register x of the set of GRs, the notation GRx<y> or GR(x)<y> is used. Bit string y may consist of only 1 bit. To specify bit string y within field F of register x of the set of GRs, the notation GRx. F<y> or GR(x).F<y> is used. Bit string y may consist of only 1 bit. Bit positions given for y are with respect to the field F (for example, DAC.DABR_ctl <0>/&).

In the FIG. 1 system, the various ones of the architectural registers are implemented in a register array. The registers in the register array are set forth in the following TABLE 1.

TABLE 1

| CPU Register Array | |
|---|---|
| RA NOs. | |
| 0X | Control State General Registers |
| 1X | Control State Parameters |
| 2X | DAC/CI Parameters/Control State VBPA |
| 3X | Control State AR MAP Registers |
| 4X | Domain-Native General Registers |
| 5X | Domain Counters/Domain Parameters |
| 6X | Domain Parameters/Domain VBPA |
| 7X | Domain AR MAP Registers |
| 8X | Domain-Native Control Registers |
| 9X | Domain Parameters |
| AX | Access Registers |
| BX | Access Registers |
| CX | Guest Control Registers |
| DX | Guest Parameters |
| EX | Guest Parameters |
| FX | Reserved for Control State Software |

In FIG. 1, the main Store 8 contains a system storage area where Control State software and the Hardware System Area (HSA) reside, and domain storage area(s), one for each domain. Each storage area is a separate address space, or address dimension, that is, for example, up to 2 GB in size. Mapping of these address spaces to physical main storage is via blocks of storage that are 2 MB or larger.

"Expanded Storage" Control State software and domains may each optionally have its own expanded storage. Mapping of Control State or domain expanded storage areas to physical expanded storage is similar to main storage mapping.

"Shared Global Storage" The architecture can support a large single system image that is composed of multiple tightly coupled (i.e., shared main memory) multiprocessors (TCMP)Shared global storage (SGS) permits data to be shared between TCMPs by functionally connecting the SGS to the main storage of each of the TCMPs. A domain in a TCMP can share all or a portion of SGS with a domain in another TCMP. Mapping of domain SGS to physical SGS is similar to the expanded storage and main storage mapping.

In the FIG. 1 system, the register array (RA) Complex 17 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or CI. The RA contains most architecturally-defined registers and controls, including Control State prefix, domain-native prefix, guest prefix, DAC, feature control bits, general and control registers.

The architectural registers that are not in the same physical register array are listed as follows:

The Control State PSW is not in the RA. The host PEW to be saved in the interpretive-execution mode is also not maintained in the RA; it is saved in the LPSD. (Note that although the domain-native and guest PSWs are provided in the RA for CSSW to inspect and modify, the instruction-address field (bits 33:63) is invalid).

The host GRs 14 and 15 defined to be saved in the interpretive-execution mode are not maintained in the RA; they are saved in the LPSD. (Note that the User State and Control State GRs are in the RA).

There is one set of FRs provided in User State, and they are not contained in the register array.

In FIG. 1, main storage 8 contains (1) a system storage area (SSA) where Control State Software (CSS) [both instructions and data] resides and where the Hardware System Area (HSA) resides, and (2) domain storage areas (DSA), one for each domain. Mapping of these address spaces to physical main storage is via blocks of storage that are, for example, 2 MB or larger. A domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS>and PSW<T> to determine the mode of accessing main storage, or it may choose to use another set of three bits to determine the mode of accessing main storage, which can be different from the current one, as specified by the user PSW.

Detailed System—FIG's. 2, 3, 4

In FIG's. 2, 3 and 4, further details of the computer system of FIG. 1 are shown with an orientation as depicted in the lower right-hand corner of FIG. 1. The computer system operates in a pipelining fashion where operation is divided into a number of segments including P, A, T, B, R segments and D, A, T, B, X, and W segments. The units of FIG's. 2, 3, and 4 operate generally over the D, A, T, B, X, and W segments after a current instruction is loaded into the IDR register 65. To load an instruction, the P segment performs priority resolution, the A segment performs instruction address presentation, the T segment performs TLB lookup and cache tag matching, and the B segment loads the current instruction into the IDR register 65.

In FIG. 2, the I-Unit 5 fetches instructions into the instruction data register (IDR) 65 which are to be processed in a pipeline fashion. Up to six instructions, for example instruction $I_1$, $I_2$, $I_3$, $I_4$, $I_5$, and $I_6$ can be processing in the FIG's. 2, 3, and 4 units in the D, A, T, B, X, and W segments.

In FIG. 2, the I-fetch unit 14 fetches instructions and stores them into the IDR 65 and delivers them to the storage unit Op Pipe 12 and the storage unit I-fetch pipe 15 to maintain a flow of instructions to be executed. The units of FIG. 2 cooperate with the register array 17 for controlling the flow of instructions and operands in the pipeline execution of the computer system.

The I-fetch unit 14 pre-fetches each instruction into the instruction data register IDR 65 so that when the D segment commences, the I-fetch unit 14 has finished for the current instruction, for example instruction $I_1$, and is pre-fetching subsequent instructions for example instructions $I_2$, $I_3$, $I_4$, $I_5$, $I_6$ and $I_7$. The I-fetch unit 14 during prefetching interacts with the storage unit 4 during the P, A, T, B, R segments that all precede the D, A, T, B, X, and W segments.

In FIG. 2, the IDR 65 provides information to the operand address unit 11. The operand address unit 11 determines addresses information to be processed by instructions. The addresses of operands are passed to the storage unit of operand pipe 12 which fetches the operands which are to be operated upon and delivers them to the execution unit 13. The execution unit 13 performs arithmetic and logical functions on the operands such as add, multiply, divide, move, or, and shift.

After prefetching, the D segment is the decode cycle for instruction decoding of the instruction in IDR register 65.

The A segment is address presentation for the S-unit 4. The T segment is a translation TLB lookup and cache tag match cycle. The TLB is a translation look-aside buffer. The B segment is the buffer cycle when, if a correct translation occurred in the TLB and if the line of data addressed is in the cache, the data is accessed and latched into the operand word register OWR (46, 49, 52). The X segment is for execution in the E-Unit 13 which takes data from the OWR, executes on the data and places the result in the result register (48, 51, 54). The W segment is for writing the results to the location specified by the instruction, for example, to an internal register in register array 17 or back to main storage 8.

Referring to FIG.'s 2, 3, and 4 the instruction buffer register 65 is loaded by the I-fetch unit 14. The instruction buffer register 10 in turn loads the IDR register 65 in four fields, D1, D2, D3 and D4. The contents of the register 65 are selected to read the system or user general purpose registers 66 (GPR's). The contents of the general purpose registers are selected into the three-input adder 89.

After the SPKA instruction is latched into the IDR 65, the data address in the DAR register 68, valid in the D segment, is staged through the address registers in the A, T, B, X and W segments using the registers DAR 68, AAR 75, TAR 81, BAR 43, XAR 44, and WAR 45, respectively. In one alternate embodiment, the registers AAR 75, TAR 81, BAR 43 are eliminated and the equivalent information is obtained from other registers. Conceptually, however, these registers still exist even in the alternate embodiment.

Following the ESA/390 architecture, an operand storage address consists of three components, a base, an index and a displacement. The base, index and displacement values from GPR's 66 are added in adder 89 to form the effective address which is latched into the ARSLT and/or AEAR registers 73 and 71. The adder 89 forms the effective address and it is placed into the AEAR effective address register 71 and into the ARSLT result register 73. The contents of the effective address register 71 are present in the A segment and are used, among other things, as part of the access to the storage unit Op pipe 12 to obtain an operand from the storage unit. The contents are also stored into the T operand address registers 1 and 2, TOAR1 79 and TOAR2 80 in the T segment. The contents of one of the registers 79 or 80 are passed to the B segment operand address registers, BOAR 87. The storage unit Op pipe 12 includes a register 90 which is loaded with the PSW Key which is to be used for key protection checking when the storage unit is accessed. The key from the register 90 is compared in comparator 91 with a key from the OP TLB unit 84 to determine if a key match exits. The other portions of the TLB including the OP tags 85 and OP buffer 86 are also compared in comparator 92 to generate a TLB MATCH signal. If the key match from comparator 91 is not asserted, meaning that the key from register 91 does not match the key from the TLB unit, then the TLB match signal is not asserted meaning that a protection key violation has occurred. If the keys do match and all the other required matches are also present, the TLB match signal is asserted indicating that, among other things, no key protection violation has occurred.

If the instruction being processed is a SPKA instruction, for example, then the processing during the X segment will cause a new PSW including a new PSW $Key_N$ to be stored through the RR result registers 48, 51 and 54 to the register array complex 17. The PSW will be loaded directly into the register array 56 and also will be stored into the PSW Key shadow register 95. The PSW register 95 holds a duplicate copy of PSW Key stored in the register array 56.

Once the D-cycle of a SPKA instruction is complete, the effective address latched in The AEAR register 71 will be moved down the pipeline to provide a new $PSW_N$ in the W segment provided nothing prevents the new $PSW_N$ from being written. Instruction Fetch Platform—FIG. 5

In FIG. 5, further details of the I - Fetch Unit 14 of FIG. 1 are shown. In FIG. 5, the IDR Register 65 of FIG. 2 is expanded and is shown together with the circuitry for loading the IDR 65 with a sequence of instructions such as shown in TABLE A above.

In FIG. 5, the IDR 65 is loaded from the storage unit cache 200 or the FDR's 201. Selection of instructions into the FDR's 201 is under control of the selector 202 which in turn is controlled by The FDR control 221. Selection of instructions from the cache 200 or the FDR's 201 is under control of the selection gates 204 and 205 which in turn are controlled by the IFCDB control 222. Selection of instructions from the FDR's is under control of the selection gate 203 which in turn is controlled by the FDR control 221. Selection gate 206 controls selection of the selected output of selector 205 into the IB1 buffer register 210. Selector 206 is under the control of the IB1 control 223. The selection from the buffer register IB1 or from the selector 205 is under control of the selector 207 which in turn is controlled by the IB0 control 224. The selected instruction selected by selector 207 is latched in the buffer register IB0 211. Selection of the contents of the IB0 register 211 by selector 208 is under control of the HW select control 227 and selector 208 in turn feeds the selector 213 which is under control of the IFDB control 228. The output from selector 213 or from the cache through selector 204 is under control of selector 214 which in turn is controlled by the IDR select control 229. The selected instruction from selector 214 is input to the IDR 65 which is staged through the IDR 65 stages IDR, AIDR, TIDR, BIDR, XIDR, WIDR, and ZIDR labeled 65-1, 65-2, 65-3, 65-4, 65-5, 65-6 and 65-7, respectively. The output form the ZIDR stage of the IDR 65 is selected by the selectors 237 and 238 is the DBUS of the Op Address Unit of FIG. 2.

In FIG. 5, a decoder 270 decodes the instruction length count, ILC, from the instruction in the D-segment instruction data register (IDR). The ILC is latched into the AILC register 271 and staged to the TILCR register 272 for the T-segment. The T-segment ILC, TILC, is added in adder 273 to the contents of the BNSIAR register 275 to form the next seqential instruction address (NSIA) which is stored back into the BNSIAR register 275. When a branch or other condition (BR) indicates that the next instruction in the sequence determined by adding the ILC to the current instruction is not the next instruction, the BNSIAR is loaded directly from the BOAR 87 of FIG. 2 under control of selector 274. The B-segment next sequential instruction address, BNSIA, is determined one instruction flow ahead of the current instruction in the pipeline. The BNSIA in the BNSIAR is a predicted value based on instruction length count.

In FIG. 5, control of the selection of which instructions to feed into the IDR register 65 is under the selection controls 221 through 229 in control unit 242. These controls receive status information from status unit 245 which is loaded by the S-unit Fetch Status 244. Status unit 245 also provides status to the IFETCH state machine 243. The S-unit Fetch Status 244 loads the FDR status 231, IB1 status 232, IB0 status 233, IDR status 234, EXDR status 235 and the BUBBLE UP STATUS 236 in the status unit 245. The different status and control conditions and related circuits for a main frame computer are extensive, and many of the details related thereto are not relevant to the present invention, but such details can be found, for example, in the Amdahl 5995-A computers. The particular control and status conditions which are relevant for selecting instructions in connection with the present invention will be described in detail hereinafter.

Register Array Complex—FIG. 6

In FIG. 6, further details of the register array complex 17 of FIG. 1 are shown. The complex includes registers 293, PSW register 280, RAM complex 281, timer register 291, and copy register 292. In FIG. 6, the RAM complex 281 is like that shown in the above-identified cross-referenced application entitled MEMORY HAVING CONCURRENT READ AND WRITING FROM DIFFERENT ADDRESSES. The PSW register 280, the TIMER register 291, and the copy register 292 use the same data in lines DI_H and DI_L which are the RRH and RRL lines, RRout, from the result register. Similarly, the read address lines RA_1 and RA_2, the write address lines WRA, the even and odd write strobes WR_EVE and WR_ODD, and the control lines CTRL are as shown in the cross-referenced application. The selectors 282 and 283 are like the selectors 24 and 25 in FIG. 3 of the cross-referenced application with the addition of the PSW inputs.

The RAM complex 17 can concurrently read and write to different addresses. As described in detail in the cross-referenced application, the RAM complex includes two RAMs, each having an address selector. The RAM complex includes a data out multiplexer for selecting outputs from one of the RAM's. The RAM complex includes a tag array storing an array of tag bits, one for each address in the RAM's. The tag bits are used to control the address selectors and multiplexer.

A single bit tag is provided in the tag array for each entry in the RAM's. The tag marks which one of the two RAM's has the valid data for the corresponding specific address tag. During a RAM read cycle, the tag routes the read address through the address selector for the correct one of the RAM's. The correct RAM is read using the read address and a staged copy of the tag controls the data out selector to select data from the correct RAM for the data out bus.

During a concurrent read and write cycle, the tag selects the read addresses for one RAM and selects the write address for the other RAM. A write enable signal, is provided for the write RAM. The tag for the write address is then updated in the tag array to point to the write RAM.

With the ability to read and write concurrently to different addresses, enhanced performance results by using only a single operation to concurrently read and write to the same address in the RAM complex.

Multiple CPU System—FIG. 7

In FIG. 7, a multiple CPU embodiment of the FIG. 1 system is shown. The FIG. 7 system includes a service processor 6, I/O Unit 9, a main store 8, system control unit 7 and a plurality of CPU's including CPU(0), ..., CPU(n-1). Each of the CPU's includes a register array including the register arrays RA(0), ..., RA(n-1). The register arrays in each of the CPU's of FIG. 7 are like the register array complex 17 of FIG. 1 and of FIG. 6.

Each register array RA (0), ..., RA ( n- 1 ) in the CPU's of FIG. 7 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or Control Interception (CI). Each RA contains architecturally-defined registers and controls, including Control State prefix, domain-native prefix, guest prefix, DAC, feature control bits, general and control registers.

The Control State PSW is store in the PSW register in the RA complex as described in connection with FIG. 6. The host PSW to be saved in the interpretive-execution mode is saved in the storage data block (SDB) of main store 8. The host GRs 14 and 15 defined to be saved in the interpretive-execution mode are also saved in the SDB. The User State and Control State GRs are in the RA's.

In main storage 8, the system storage area (SSA) stores the Control State Software (CSS) [both instructions and data] and the Hardware System Area (HSA), and (2) domain storage areas (DSA), one for each domain. Mapping of these address spaces to physical main storage is via blocks of storage and a domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

The FIG. 1 system includes a machine unit of operation (MUO) that is used to time executions in the system. The computer system operates with a User State and a Control State and has multiple domains for logical processors. In addition to the machine unit of operation (MUO), a Domain Unit of Operation (DUO) is provided to time domain operations in the system. The DUO is used for emulating User instructions as described in the cross-referenced application.

Operation

Timer error recovery is invoked from both the exigent MCK and repressible MCK error environments. In the exigent case, a Processing Damage (PD) condition results with the Timer Source set in the MCIC. This results from a timer instruction being issued to a broken timer. The exigent MCK handlers, RMCCSEX and RMCUSEX, are the modules that are sensitive to this. If they detect that a timer is the source of the PD then RMCTIMER will be invoked to take whatever repair action is possible, set damage flags if hard broken and generate domain mode TFDs if appropriate. The overall impact of the exigent is the same as in the non-timer source condition—it depends on the state of the machine. If from User State, then it will be reflected. If from DUO and there is no MCPOINT interception, then the effect is the same—either a PD (for instruction emulation) or an SD (for interrupt emulation) will be reflected. If from non-DUO control state, only if the LP Dispatcher was current and the LP context in the LPB is invalid (indicating that the RA context is valid) will a domain MCK be presented. If there is a Timer source, then a TFD will be merged only if a PD is to be presented to the domain. The actions taken by RMCTIMER are independent of the actions taken by the Exigent MCK CI handlers. If RMCTIMER generates a TFD for the current LP and the exigent CI handler also has the condition merged with the PD, the domain will only see a single TFD—in this case merged with the PD.

Note that in Control State, SCK is the only timer instruction that references a control state timer—the C.S. TOD. But as this is used to repair the TOD (i.e., reset the 'E' bit), it will not result in a PD MCK. Thus, the only time that we would see a PD from a timer instruction in Control State would be if we are accessing a domain timer—and this should only be done as part of some emulation. Thus, there is no possibility that we would reflect a MCK inappropriately.

For repressible MCKs, RMCTIMER will be called in all cases.

RMCTIMER will perform the initial analysis of the RA timers and then call internal subroutines to handle the particular timers in error. There are also routines that are called to perform functions common to multiple timer errors. These include determining which LPs have affinity to the local CPU and attempting to move an LP to another CPU.

The analysis of the timer errors has to accommodate the way TFD MCKs are generated. Specifically, if any timer is in the soft error state ('E' bit on, 'T' bit off), no new TFD MCKs will be generated. However, errors may still be detected. The implications for Macrocode are that while processing a TFD MCK and serially checking the timer RAs, a timer may enter either the soft or hard error states without a new MCK as long as any other timer has an 'E' bit set. Thus, it is possible to have checked a timer and found no errors and to have it enter the error state before we reset the 'E' bit of a timer that caused the first MCK. To allow for this possibility, we have to have an iterative algorithm that will recheck all the timers if any error is detected while traversing the timers. Only when no new error conditions are detected can we be sure that any subsequent error will result in a new MCK.

One source of timer errors is a parity error in the I-unit's copy of timer control information. If this occurs, all timers dependent on that information will take an error. There is no mechanism to inform Macrocode that this is the source of the error. So to account for this possibility, on any error condition we will force this information to be reloaded. This control information consists of:

1. Control State PSW
2. Control State CR0
3. Domain Mode Control
4. The CIIM

The CI resulted in a new PSW and since the other information is contained in RAs, all that is required is a STSRA followed by a LSRA for each of them.

The following sections describe the actions taken in the soft error situation and the hard error situation (i.e., when 'T' bit first comes on), for each timer. Note that the following assumes the control information has already been reloaded—in fact it will be done once at the start of each scan of the timer RAs.

Control State CPU Timer

Soft Error Condition

On a soft error, the CPU timer will be reloaded with a recalculated value. This is determined from the current TOD and the time the CPU timer was expected to go off.

a. Access TQB Q.
b. If no TQBs are set, then set CPU Timer to max value.
c. Calculate difference between current TOD and TOD when timer is set to go off.
d. If TQB interval has expired, set CPU Timer to 0—to force Timer CI as soon as we enable for it.
e. If TQB interval not expired, set CPU Timer to new interval value.
f. Check next timer.

Hard Error Condition

In this case, the only action will be to set the damage flag—to inform timer services to use alternate algorithms for timing.

a. Set PSX damage flag for CPU Timer.
b. Check next timer.

Control State TOD

Soft Error Condition

The basic idea here is to sync the TOD to a value from another CPU. This will be done by the TOD SYNC module (to be written). It is anticipated that the TOD will be sync'd or it will not be, however, there might be the possibility that a new TOD value was obtained from the operator—this is still TBD and part of the TOD sync design. If a new value is obtained, then every domain will need a TFD—because the domain epoch difference would now be invalid too. This is being mentioned here only to indicate a further enhancement—for the time being we assume either success or failure. If the TOD is not reset back to the exact value it should be, it will be treated as a hard error and processor termination will be forced.

a. Call TOD SYNC module.
b. If TOD reset correctly—redo time stamps in the MCB and MIB, then proceed to check next timer.

If TOD not reset—set flag to force processor termination. Note—as part of processor termination, there will be an attempt to move LPs to another CPU and those that can't be switched will be checkstopped.

Domain Dispatch Timer

Soft Error Condition

On a soft error, the CPU timer will be reloaded with 0. This will force a pending CI to occur when it next starts to decrement. Basically, we are forcing the end of a time slice here.

a. Set domain Dispatch Timer to 0.
b. Check next timer.

Hard Error Condition

In this case, we will attempt to vacate the CPU—i.e., switch LP affinities to other CPUs. However, if not all LPs are moved they will continue to be dispatched on this CPU and we will have to use CPU Timer facilities for time slicing.

a. Set PSX damage flag for Domain Dispatch Timer.
b. Invoke Recovery Quiesce.
c. Call vacate routine—note no special action for LPs that aren't reassigned to other CPUs.
d. Resume from Recovery Quiesce.
e. Check next timer.

Interval Timer Residue Counter

Soft Error Condition

On a soft error, the ITRC will be reloaded with 0. If there was a current LP, the only impact will be that a few timer ticks are lost—there is no need to reflect an error.

a. Set ITRC to 0.
b. Check next timer.

Hard Error Condition

The loss of this timer only affects LPs if they use the facility—i.e., only 370 guests. However, we don't necessarily know if a given domain will use the facility or not so we will vacate the CPU—just in case it does. The domain impacts are: will affect LPs if they were in guest mode and not reassigned to other CPUs, or for the current LP it is was in guest mode. At this time, it is still to be determined exactly what condition is to be reflected to the Host as architecturally this represents an IT repressible condition, which is S/370 only, however, the MCK itself will cause a Host interception and IT is not defined for ESA (the mode of the Host), thus most likely it has to be reported as a TFD—but we have to confirm this. The residual affect for LPs that still remain on this CPU will be a PD MCK if SIE is issued. This prevents any further use of the timer.

a. Set PSX damage flag of the ITRC.
b. Invoke Recovery Quiesce.
c. Call vacate routine—this returns list of LPs that had affinity for this CPU.
d. Loop through list of LPs: —If LP was current and in Guest mode—set up pending TFD. —If LP was not current, not reassigned and in Guest mode—set up pending TFD.
e. Resume from Recovery Quiesce.
f. Check next timer.

Run Time Accumulator

Soft Error Condition

On a soft error, the RTA will be reloaded with the last known value—presumably this will be in a scheduler data area. This will not have an impact on any of the domains and should only minimally impact the scheduler. At this time use of the RTA has not been implemented so it is not clear exactly where the previous known value will be located.

a. Set RTA to last known value.
b. Check next timer.

Hard Error Condition

In this case, we will just set the damage flag for the RTA. At this time use of the RTA has not been implemented, so it is not clear how this will impact the scheduler, but it will have to be sensitive to the damage flags and forego any use of this timer if so indicated.

a. Set PSX damage flag for the RTA.
b. Check next timer.

Domain Native CPU Timer

Soft Error Condition

On a soft error, the DN CPU Timer will be reloaded with 0, mainly to clear the 'E' bit. If there was a current LP, then a TFD will be generated for the LP—will be up to the LP to reset to a good value.
 a. Set DN CPU Timer to 0.
 b. If there was a current LP, the set a pending TFD for the LP.
 c. Check next timer.

Hard Error Condition

The loss of this timer affects any LPs with affinity to this CPU, so we will vacate the CPU. The domain impacts are: only affect LPs if they wee not reassigned to other CPUs, r the current LP, reassigned or not. The residual affect for LPs that still remain on this CPU will be a PD MCK if SPT or STPT is issued. This prevents any further use of the timer.
 a. Set PSX damage flag for the DN CPU Timer.
 b. Invoke Recovery Quiesce.
 c. Call vacate routine—this returns list of LPs that had affinity for this CPU.
 d. Loop through list of LPs: —if LP was current—set up pending TFD. —if LP was not current and not reassigned then set up pending TFD.
 e. Resume from Recovery Quiesce.
 f. Check next timer.

Domain Native Clock Comparator

Soft Error Condition

On a soft error, the DN CKC will be reloaded with 0, mainly to clear the 'E' bit. If there was a current LP, then a TFD will be generated for the LP—will be up to the LP to reset to a good value.
 a. Set DN CKC to 0.
 b. If there was a current LP then set a pending TFD for the LP.
 c. Check next timer.

Hard Error Condition

The loss of this timer affects any LPs with affinity to this CPU, so we will vacate the CPU. The domain impacts are: will affect LPs if they were not reassigned to other CPUs, or the current LP, reassigned or not. The residual affect for LPs that still remain on this CPU will be a PD MCK if SCKC or STCKC is issued. This prevents any further use of the timer.
 a. Set PSX damage flag for the DN CKC.
 b. Invoke Recovery Quiesce.
 c. Call vacate routine—this returns list of LPs that had affinity for this CPU.
 d. Loop through list of LPs: —if LP was current—set up pending TFD. —if LP was not current and not reassigned then set up pending TFD.
 e. Resume from Recovery Quiesce.
 f. Check next timer.

Domain Native Epoch Difference

Soft Error Condition

On a soft error, if there was a current LP, then the DN Epoch Difference can be reloaded from the LPB (note there is a requirement then that the emulation routine for SCK also update the LPB copy when it alters the live RA). If no current LP then set it to 0—clear 'E' bit.
 a. If from User State or DUO, then get the current LP.
 b. If from Control State and LP Dispatcher was current process, then determine if LP context in RA is valid—consider this as current LP.
 c. If a current LP, get the LPB copy of DN Epoch Difference and load into FLA.
 d. If no current LP, then set DN Epoch Difference to 0.
 e. Check next timer.

Hard Error Condition

The loss of this timer affects any LPs with affinity to this CPU, so we will vacate the CPU. The domain impacts are: only affect LPs if they were not reassigned to other CPUs, or the current LP, reassigned or not. The residual affect for LPs that still remain on this CPU will be to give a cc=3 on the Macrocode emulation of SCK or a CC=2 for STCK (done by HW).
 a. Set PSX damage flag for the DN Epoch Difference.
 b. Invoke Recovery Quiesce.
 c. Call vacate routine—this returns list of LPs that had affinity for this CPU.
 d. Loop through list of LPs: —if LP was current—set up pending TFD. —if LP was not current and not reassigned, then set up pending TFD.
 e. Resume from Recovery Quiesce.
 f. Check next timer.

Guest CPU Timer

Soft Error Condition

On a soft error, the Guest CPU Timer will be reloaded with 0. If there was a current LP in Guest mode, then a TFD will be generated for the LP.
 a. Set Guest CPU Timer to 0.
 b. If there was a current Lp in Guest mode, then set a pending TFD for the LP.
 c. Check next timer.

Hard Error Condition

The loss of this timer only affects LPs if they use the facility—i.e., only if Guest mode entered. However, we don't necessarily know if a given domain will use the facility or not, so we will vacate the CPU—just in case it does. The domain impacts are: will affect LPs if they were in Guest mode and not reassigned to other CPUs, or for the current Lp if it was in guest mode. The residual affect for LPs that still remain on this CPU will be a PD MCK for SIE or for SPT and STPT issued in Guest mode. This prevents any further use of the timer.
 a. Set PSX damage flag for the Guest CPU Timer.
 b. Invoke Recovery Quiesce.
 c. Call vacate routine—this returns list of LPs that had affinity for this CPU.
 d. Loop through list of LPs:
 e. Resume from Recovery Quiesce.
 f. Check next timer.

Guest Clock Comparator

Soft Error Condition

On a soft error, the Guest Clock Comparator will be reloaded with 0. If there was a current LP in Guest mode, then a TFD will be generated for the LP.
 a. Set Guest Clock Comparator to 0.

b. If there was a current LP in Guest mode, then set a pending TFD for the LP.

c. Check next timer.

Hard Error Condition

The loss of this timer only affects LPs if they use the facility—i.e., only if Guest mode entered. However, we don't necessarily know if a given domain will use the facility or not so we will vacate the CPU—just in case it does. The domain impacts are: will affect LPs if they were in Guest mode and not reassigned to other CPUs, or for the current LP if it was in guest mode. The residual affect for LPs that still remain on this CPU will be a PD MCK for SIE or for SCKC and STCKC issued in Guest mode. This prevents any further use of the timer.

a. Set PSX damage flag for the Guest Clock Comparator.

b. Invoke Recovery Quiesce c. Call vacate routine—this returns list of LPs that had affinity for this CPU.

d. Loop through list of LPs: —if LP was current and in Guest mode—set up pending TFD. —if LP was not current, not reassigned and in Guest mode—set up pending TFD.

e. Resume from Recovery Quiesce.

f. Check next timer.

Guest Epoch Difference

Soft Error Condition.

On a soft error, the Guest Epoch Difference will be reloaded with 0. If there was a current LP in Guest mode, then a TFD will be generated for the LP.

a. Set Guest Epoch Difference to 0.

b. If there was a current LP in Guest mode, then set a pending TFD for the LP.

c. Exit Timer Checks.

Hard Error Condition

The loss of this timer only affects LPs if they use the facility—i.e., only if Guest mode entered. However, we don't necessarily know if a given domain will use the facility or not so we will vacate the CPU—just in case it does. The domain impacts are: will affect LPs if they were in Guest mode and not reassigned to other CPUs, or for the current LP if it was in guest mode. The residual affect for LPs that still remain on this CPU will be a PD MCK for SIE. For SCK and STCK issued in Guest mode, the appropriate CC will be generated—by emulation for SCK and by HW for STCK. This prevents any further use of the timer.

a. Set PSX damage flag of the Guest Epoch Difference.

b. Invoke Recovery Quiesce.

c. Call vacate routine—this returns list of LPs that had affinity for this CPU.

d. Loop through list of LPs: —if LP was current and in Guest mode—set up pending TFD. —if LP was not current, not reassigned and in Guest mode—set up pending TFD.

e. Resume from Recovery Quiesce.

f. Exit Timer Checks.

Internal Interface Changes

Macrocode components that use the timers have to be sensitive to the damage flags. This includes:

1. Timer component—use of CPU Timer.

2. Dispatcher—will have to check for expired TQBs when CPU timer is hard broken.

3. LP Dispatcher—will have to use CPU Timer if Domain Dispatch Timer is hard broken.

4. Scheduler—use of Run Time Accumulator. 5. Emulation Routines that access/update any domain timers that may be hard broken.

Module Function Definition

RMCCSEX

The Control State exigent MCK handler is changed to invoke RMCTIME if the Timer Source bit is set with a PD MCK.

RMCUSEX

The User State exigent MCK handler is changed to invoke RMCTIMER if the Timer Source bit is set with a PD MCK.

Referring to FIG. 8, a timer system is shown that permits individual timer registers to be taken off line from the timer complex. A single register is taken off line instead of checkstopping the entire computer system due to a damaged timer, thereby reducing system outages and thus providing increased availability of the system.

A timer unit 1500 includes an I-bit (inhibit-bit) register 1502 for storing local copies of the I-bits and an Error Inhibiter 1501 for suppressing the setting of any EHL's 1200 associated with the off line register as well as the Control State Timing Facility Damage (TFD) interrupt which would normally occur, and forces the E-bit on if the off-line register is read out of the timer complex.

Process Control (PC) 1100 has a I-bit register 1120 which contains local copies of the I-bits and logic 1130 to detect a read or write command to an off-line timer register and consequently force a clock-on PD machine check and sets the MCIC<timer> bit which indicates to Macrocode that the timer facility was the source of the machine check.

A Register Array (RA) contains a Timer Facility Error Inhibit Register 1120 which is used by Macrocode to determine which timer(s) 1000 are off-line.

SCode control code executes threshold routines which will set the I-bits in I-bit registers 1120, 1502 and 1600 in PC 1100, algorithm to set the MCIC<timer> bit for timer I-bit related errors; and modifying the E-unit STCK (Store Clock) algorithm to take the I-bit into account.

Macrocode performs one of two actions, depending on which timer 1000 is in error. Either the function of that timer is emulated by Timer Emulator 1400 or the appropriate error condition is reflected to the domain.

Under normal operating conditions, all of the T-bits are off and the error detection logic 1110 in PC 1100 is not generating any error signals. When an error occurs on a timer register 1000 an EHL 1200 will be set, causing the System Error Handler (SEH) 1300 to be invoked. When SEH 1300 determines that the error has crossed its threshold limit, special SCode is called to set all copies of the I-bits for the damaged timer. From this point onward no more EHL's 1200 will be set, or TFD's generated, due to this damaged timer. Instead, PC 1100 will detect a read or write command to this damaged timer and force a clock-on PD machine check. The exigent machine check algorithm will set the MCIC<timer> bit so that Macrocode knows that the machine check is due to a timer reference with the I-bit set. Macrocode will then take appropriate action for this timer as explained above.

The computer system has one or more timers 1000 and error detection circuitry 1110 for detecting errors in the timers 1000 and providing timer error signals. The computer system has addressable timer registers for operation as the timers 1000. The timer system permits timers to be taken off line in the case of a timer error signal. The timer system includes an I-bit register 1502 for storing I-bits for suppressing timer error signals and logic means 1130 for detecting a read or write command to a damage timer and for indicating that the addressed timer was the source of the error. A register array includes a Timer Facility Error Inhibit Register 1600 for indicating which timers 1000 are off-line. The computer system includes control code, Scode, for setting the I bits in registers 1120, 1502 and 1600. Finally the computer system has code 1400 emulating the function of a register that is off line.

While the invention has been particularly shown and described with reference to preferred embodiments thereof it will be understood by those skilled in the art that various changes in form and details may be made therein without departing from the spirit and scope of the invention.

We claim:

1. A timer system, in a computer system having x addressable timers where $x \geq 1$, for taking a damaged said timer off line without check stopping the entire computer system, each said timer providing a timer output representing a time value of said timer, said computer system further comprising, command means for issuing timer read and write commands, error detection means for detecting errors in said timers and upon detecting an error in said timer generating an error signal identifying said timer as an error timer, process control means for processing said timer read and write commands to said timers, a system error handler for carrying out error correction procedures upon receipt of said error signal for said error timer, said timer system comprising:

a timer facility error inhibit bit register having x, stages, where each said stage is associated with a designated one of said timers and is set to a first state when said associated timer is on line and available to said computer system and set to a second state when said associated timer is off line and not available to said system, for indicating to said computer system which said timers are off line;

a timer unit including:
an inhibit bit register having x stages where each said stage is associated with a designated one of said timers and is set to a first state when said associated timer is on line and available to said computer system and set to a second state when said associated timer is off line and not available to said computer system, and
an error inhibiter means for inhibiting said error signal for said error timer if said stage associated with said error timer in said inhibit bit register in said timer unit is set to said second state;

said process control means further including:
an inhibit bit register having x stages where each said stage is associated with a designated one of said timers and is set to a first state when said associated timer is on line and available to said computer system and set to a second state when said associated timer is off line and not available to said computer system, and
a detection means for detecting when said command means issues said timer read or write command for said timer whose associated stage in said inhibit bit register in said process control means is set to said second state and for thereupon issuing signals to said computer system indicating that said timer command cannot be completed due to said addressed timer being off line and not available to said computer system; and said system error handler further including:
detection means for detecting said error timer as a damaged timer when said system error handler cannot correct said error for said error timer; and
means for marking said damaged timer as a damaged timer by setting said stage associated with said damaged timer in said timer facility error inhibition register, said inhibit bit register in said timer unit and said inhibit bit register in said process control means.

2. The timer system of claim 1 further comprising:
emulation means for emulating said damaged timer when said stage associated with said damaged timer in said timer facility error inhibit register is in said second state, said emulation means emulating said damaged timer by using said time values of one or more said timers that are on line and available to the computer system.

* * * * *

UNITED STATES PATENT AND TRADEMARK OFFICE
CERTIFICATE OF CORRECTION

PATENT NO. : 5,355,470
DATED : October 11, 1994
INVENTOR(S) : Jon K. Lexau et al.

It is certified that error appears in the above-identified patent and that said Letters Patent is hereby corrected as shown below:

Column 23, line 43, after "x" delete the comma ",";

Column 24, line 34, after "timer" the semicolon should be a comma --,--.

Signed and Sealed this

Ninth Day of April, 1996

BRUCE LEHMAN

Attest:

Attesting Officer           Commissioner of Patents and Trademarks